United States Patent [19]

Michiels et al.

[11] Patent Number: 6,102,589
[45] Date of Patent: Aug. 15, 2000

[54] PROCESSING METHOD OF BLACK-AND-WHITE PHOTOGRAPHIC MATERIALS

[75] Inventors: Frank Michiels, Arendonk; Benedictus Jansen, Geel, both of Belgium

[73] Assignee: Agfa-Gevaert, N.V., Mortsel, Belgium

[21] Appl. No.: 09/235,317

[22] Filed: Jan. 22, 1999

Related U.S. Application Data

[60] Provisional application No. 60/079,870, Mar. 30, 1998.

[30] Foreign Application Priority Data

Feb. 3, 1998 [EP] European Pat. Off. .............. 98200319

[51] Int. Cl.$^7$ ...................................................... G03D 3/02
[52] U.S. Cl. .......................... 396/630; 396/622; 396/626; 430/398; 204/528
[58] Field of Search ..................................... 396/622, 626, 396/630, 569; 430/398, 399, 400; 210/688, 282, 912; 204/528, 634, 273

[56] References Cited

U.S. PATENT DOCUMENTS

| | | |
|---|---|---|
| 3,057,282 | 10/1962 | Luboshez . |
| 3,379,113 | 4/1968 | Hosoya et al. . |
| 5,379,087 | 1/1995 | Devaney et al. . |
| 5,579,076 | 11/1996 | Calisto et al. ............................ 396/626 |
| 5,581,322 | 12/1996 | Fyson ....................................... 396/630 |
| 5,611,077 | 3/1997 | Ishikawa .................................. 396/630 |
| 5,678,112 | 10/1997 | Bernard et al. .......................... 396/626 |
| 5,689,747 | 11/1997 | Juetter et al. ............................ 396/626 |

FOREIGN PATENT DOCUMENTS

| | | |
|---|---|---|
| 0 316 864 | 5/1989 | European Pat. Off. . |
| 2 424 569 | 11/1979 | France . |
| 2 205 176 | 11/1988 | United Kingdom . |

OTHER PUBLICATIONS

P J Mutter: "Silver Recovery Management For Motion Picture Laboratories", SMPTE Journal, vol. 93, No. 9, Sep. 1984, XP002071874.

Grant Haist: "Modern Photographic Processing", vol. 1, 1981, John Wiley, New York, XP002071875, pp. 563–566.

*Primary Examiner*—Alan A. Mathews
*Attorney, Agent, or Firm*—Breiner & Breiner

[57] ABSTRACT

A method of processing an exposed black-and-white silver halide photographic film material, the method having the steps of developing in a developer solution, fixing in a fixer solution, replenishing of fixer and developer solution, rinsing in a washing solution and drying, characterized in that fixing is performed in one step and under such conditions that a "silver equilibrium ratio" of less than 2.0 is maintained, the said ratio being defined as the ratio between actual by the film material in the rinsing step through carry-over (cross-over) of silver from the fixing solution to the washing solution and amount of silver brought into the washing solution and the total amount of silver that theoretically could be brought into the washing solution by the film material by such carry-over; a "fixer to film silver ratio" of less than 0.2 is obtained, this ratio being defined as the ratio between silver content in "running equilibrium condition of the fixer" and amount of silver in the film material to be fixed in the fixing step, wherein said "running equilibrium condition of the fixer" is the condition attained after having replenished said fixing solution twice. By this method an ecologically favourable minimization of silver content in the washing solution has been obtained without impairing the processing speed, without enhancing processing costs and without excessive regeneration.

12 Claims, 2 Drawing Sheets

PROCESSING METHOD OF BLACK-AND-WHITE PHOTOGRAPHIC MATERIALS

This application claims benefit of Provisional Application 60/079,870, filed Mar. 30, 1998.

FIELD OF THE INVENTION

The present invention is related with the processing of a black-and-white silver halide photographic material and, in particular, with the processing of radiographic materials.

BACKGROUND OF THE INVENTION

During the last decade it has been an ever lasting demand to offer ecologically justified processing ability as well as to speed up processing of silver halide photographic films, more particularly films coated with high amounts of silver halide. Processing time reduction can, in principle be realized during each of the processing steps as during developing, fixing, rinsing and drying. Said time reduction may however not lay burden on sensitometric properties (shorter developing times, e.g. lowering speed; shorter fixation and/or rinsing times e.g. causing preservation or archivability problems), nor on physical properties of the processed film (e.g. sticking problems of incompletely dried film sheets), etc.. Following measures known from the patent literature can e.g. be taken.

U.S. Pat. No. 5,230,993 describes a photosensitive silver halide material having a polymer capable of providing a cation site in a fixing solution in order to reduce the fixation time in the processing of these materials.

Industrial non-destructive testing materials suitable for rapid processing applications, wherein use has been made from silver halide emulsion crystals rich in silver chloride have e.g. been described in U.S. Pat. No. 5,397,687. In the said US-A hardener-free processing solutions have been used.

Methods of rapid processing, particularly with respect to rapid fixation of films coated with emulsions rich in silver chloride have been disclosed in U.S. Pat. No. 5,298,372, wherein a developer with a high sodium ion content and low developer and fixer replenishing rates are used. In the context of hard copy materials U.S. Pat. No. 5,582,959 and EP-A 0 794 456 are very useful references. In order to realize rapid fixing without sludge formation JP-A 04-42150 describes use of a hardening fixer with a specific molar ratio of sodium to ammonium ion.

It is moreover preferred that processing proceeds without generation of much waste, e.g. with a low level of silver ions in the rinsing water. So in EP-A 0 661 594 a photographic processor with an ion-exchange resin cell for recovering silver from rinse water leaving the rinsing station of the processor, characterized in that it comprises a liquid buffer station between the rinsing station and the resin-cell and flow-control means in order to controll the flowing rate of rinse water from the buffer station to the resin cell. A silver recovery device has further been described in U.S. Pat. No. 5,605,632, wherein the device comprises an ion-exchange resin bed and a pump for directing the solution through the resin bed.

Besides ion-exchange also metal-ion exchange, wherein use is e.g. made from iron wool, is known as an alternative. These methods all have the disadvantage of being cumbersome and, moreover, an additional waste stream is created.

Besides the possibility of desilvering the rinsing water, there is also the possibility to minimize the amount of rinsing water needed. This allows to have the rinsing water treated by specialized companies, since the amounts of water to be treated are smaller.

From an ecological point of view minimization of amounts of rinsing water are thus desirable in order to avoid further waste. The use of cascade fixing also allows to decrease the silver remaining in the rinsing water as has e.g. been described in EP-A 0 598 145 therein a method has been described for processing imagewise exposed photographic silver halide material by conveying said material in succession through at least a developing, a fixing and a rinsing station, wherein said fixing station comprises two distinct tanks, the fixing of the photographic material occurring completely or almost so in the first tank; a replenishment arrangement for replenishing fixer carried-over by the photographic material from the first to the second tank, the silver content of fixer in the first tank is kept below a certain maximum level by electrolytic silver recovery, said photographic material is squeezed at its cross-over from said first to the second tank to limit carry-over of fixer to said second tank; fixer is caused to overflow from said second into said first tank thereby to produce a counterflow of fixer; fixer is caused to overflow from said first tank and is pumped to said second tank, and the silver content in the second tank of said fixing station is kept below 0.05 g of $Ag^+$ per liter.

A volume of at most 250 ml for the second tank is therefore preferred. Nonetheless, the use of cascade processors usually requires an appreciable investment, and processors which are already in the market become obsolete. (cost brought about by the required expensive adaptions for processors which have a fixing or a rinsing water cascade). There is no desilvering of the fixer fluid wich may also represent an appreciable economical disadvantage.

Electrolysis of processing solutions in order to reduce waste of a heavy precious metal as silver requires the presence of an apparatus providing said electrolysis. Patents related thereto are EP-A 0 598 144, wherein desilvering under potentiostatic conditions has been described in the presence of a reference electrode sensitive to pH differences; U.S. Pat. No. 5,370,781 wherein an easy removal of silver from an electrolytical cell and wherein advantages of less storage and transport space in a flat configuration are claimed; U.S. Pat. No. 5,378,340 wherein an annular contact surface is assured at the upper opening of the electrolytic cell, in order to reduce the risks of a resistive connection to occur; EP-A 0 754 780 wherein the diffusion limitation current density of an electrolytic cell is estimated by measuring a current-flow therethrough and a desilvering current density which is lower than said limitation current density; EP-A 0 803 591 wherein means for switching from potentiostatic to galvanostatic control in response to a cell current above a treshold value when a selected cathode potential is re-established; EP-A 0 844 524, wherein between developing and fixing as an intermediate liquid, used fixer is the treatment liquid in the processing and EP-A 0 851 286, wherein upon starting processing the fixer solution comprises a mixture of fixer starter solution and fixer replenisher solution, wherein said fixer replenisher is the said fixer replenishing solution and wherein said fixer starter solution is the developing solution. As a result the difference between the freshly prepared fixer solution and the fixer solution after seasoning is minimized in order to provide constant sensitometric and physical properties of silver halide photographic materials after rapid processing in solutions, replenished with minimum amounts of said solutions.

Further in order to avoid precipitate of aluminum hydroxide in fixers containing hardening agents as e.g. aluminum salts, it has been established that use of developer solutions comprising ascorbic acid and derivatives, reductones etc., is in favour when no intermediate rinsing step is present between developing and fixing as has been described in EP-Application No. 97203096, filed Oct. 6, 1997.

OBJECTS OF THE INVENTION

Therefore it remains an ever lasting object as also posed in the present invention to minimize the silver content in the rinsing water in the processing, since a high silver contents represents an important ecological disadvantage.

It is a further object to minimize the said silver content without impairing the processing speed, without carrying over too much silver into the rinsing fluids and without enhancing processing costs.

Still a further important object is to realize the aforementioned objects without excessive regeneration, making use of processors wherein fixation is performed in one step, i.e. existing equipment of processors (so-called "installed base" processors).

Further it is an object to provide a fixer composition compatible with the above described method of processing and to provide a processor which is compatible with the said method of processing.

SUMMARY OF THE INVENTION

A method has thus been provided of processing an exposed black-and-white silver halide photographic film material comprising the steps of developing in a developer solution, fixing in a fixer solution, replenishing of fixer and developer solution, rinsing in a washing solution and drying, characterized in that fixing is performed in one step and under such conditions that a "silver equilibrium ratio" of less than 2.0 is maintained, the said ratio being defined as the ratio between actual amount of silver brought into the washing solution by the film material in the rinsing step through carry-over (cross-over) of silver from the fixing solution to the washing solution and the total amount of silver that theoretically could be brought into the washing solution by the film material by such carry-over;

a "fixer to film silver ratio" of less than 0.2 is obtained, the said ratio being defined as the ratio between silver content in "running equilibrium condition of the fixer" and amount of silver in the film material to be fixed in the fixing step, wherein said "running equilibrium condition of the fixer" is the condition attained after having replenished said fixing solution twice.

Moreover a processor having means for carrying out the method described above is provided as well as a fixer for use therein.

DETAILED DESCRIPTION OF THE INVENTION

Figure 1:
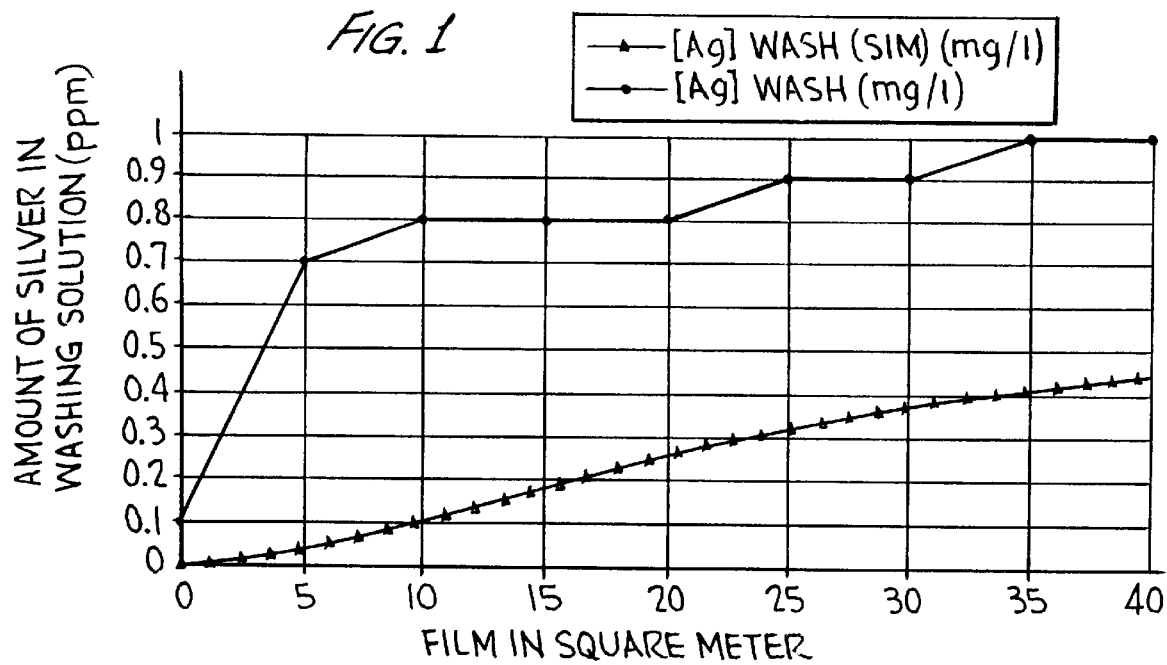
FIG. 1 illustrates the theoretically determined silver content (mg/l) compared with the practically measured silver content (mg/l) by processing of CURIX Ortho HT® in developer G138®/fixer, G334® at a replenishing rate of 600 ml/m$^2$, as a function of the number of square meter of film processed.

As is well-known by anyone skilled in the art of photography, and particularly by anyone related with processing, processing steps and processing phenomena, the fixing step is not completely finished as soon as the film has become transparent in the fixing solution, wherein the period required to become transparent calculated from the time fixation has started is called the "clearing time". In order to obtain well archivable images, the fixing time must be longer than the clearing time. This gives the formed soluble silver salts the time to diffuse out of the swollen film layer. As a rule of thumb, it is usually assumed that the total fixing time must be twice as long as the clearing time. If in specific processing conditions, a more precise estimate of the required minimal fixation time is necessary, this fixation time can be established by measuring the archivability of the processed film material. When the fixation time becomes too short, an appreciable decrease of the archivability occurs. This allows to do fast processing, since the minimum fixation time is known. What we found now teaches that nor the rule of thumb (fixing time up to at least twice the clearing time), nor the measurement of the archivability is a good measure in order to determine the minimal fixation time when ecological constraints are put on the processing.

It has been found now that, when fixing essentially proceeds in a fixer solution in one step and when fixing is performed within a time interval wherein a silver equilibrium ratio, defined as a ratio between actual cross-over of silver from the fixer solution and cross-over as theoretically expected based on carry-over (cross-over) of silver from the fixing solution to the washing solution, is less than 2.0; and when a ratio between silver amount in the fixing step in running equilibrium conditions and between silver amount of the film to be fixed is less than 0.2, and more preferably less than 0.1, a system is offered which is leading to low silver load, particularly for silver halide materials coated with huge amounts of silver halide, as e.g. those materials used for radiographic non-destructive testing applications, even when the silver halide emulsion crystals coated therein have a silver bromoiodide composition.

The invention also teaches a preferred processing embodiment according to the present invention, thus providing ecologically justified processing conditions. Moreover the present invention teaches about the important role with respect to silver load formed by oxidation processes during cross-over from the fixing unit to the rinsing unit, of silver particles formed by reduction of exposed silver halide crystals in the developing step.

This oxidation of silver, formed by reduction of exposed silver halide crystals during the developing step, appears during cross-over of the developed and fixed material from the fixing tank to the rinsing tank. Application of the method of the present invention however has lead to an unexpected combination of high coating amounts of silver in the exposed material, low replenishing amounts of fixer replenisher and low silver load in the fixing and in the rinsing unit, nevertheless applying rapid processing.

Further innovation has been realized by application of the method of the present invention in that use of an external buffering tank unit is able to catch peaks in silver concentration when the processing work volume is high, in that insight has been offered in ratios required between volume of the fixing unit and response of the electrolysis unit (desilvering unit) and in that the method can be applied to installed base processors, particularly in the processing method of exposed photographic silver halide film materials coated with high amounts of silver. Therefore it is recommended, in the context of the present invention, to clearly understand the difference between "in-line" and "off-line" desilvering. "In-line" desilvering is related with silver recovery in a tank connected to the fixer and built-in in the processor, wherein desilvered fixer solution is continuously in equilibrium with the said fixer, wherein the fixer is further replenished and wherein excess of fixing liquid is removed.

Opposite thereto "off-line" desilvering is performed in an isolated tank, collecting used fixer, wherein after desilvering the desilvered fixer is rejuvenated (adding thereto e.g. sulfite, etc.) and added as fixer replenisher solution to the replenisher.

As most important terms used in the detailed description and in the claims of the present invention following terms are further defined.

"Silver content in running equilibrium conditions" stands for the average silver content in the fixing bath after twice having replenished the fixing bath volume. The average value obtained refers to the average amount of silver content in the fixer during processing of silver halide film material. In particular in the case of electrolytical fixer desilvering it is clear that there may be appreciable variations in the silver content in the fixer. During processing the silver content of the fixer quickly increases as electrolytical desilvering units are often not able to compensate for the release of silver ions during fixation. After film processing has stopped, the desilvering further proceeds and the silver content in the fixing liquid decreases again. The silver content in running equilibrium conditions refers to the average silver content (expres-sed in g/l as metallic silver) present in the said fixing unit during processing after twice having replenished the volume of the fixing unit.

"Carry-over", also called "cross-over", refers to the amount of liquid transferred during processing from one stage or step to the following stage in the photographic processing cycle in the actual processing conditions. "Carry-over" is expressed in ml/m² and is determined by measuring the difference in weight of the film immediately after leaving the preceding processing stage (in wet condition) and after drying of the said film (in normal room conditions). E.g. carry-over from the developer to the fixer unit would typically be measured by taking out the film after leaving the developer unit (behind a squeezing roller pair, optionally present in the developer section), immediately weighing the wet film, followed by drying said wet film, and weighing it again. The loss of weight of the film is then calculated as a volume of transferred liquid per m² of film taking 1 g/ml as density of the said liquid. E.g. a weight loss of 1.0 g for a film sheet of 20 cm×25 cm corresponds to a carry-over of 20 ml/m².

The "silver equilibrium ratio" is the ratio between
the actual amount of silver brought into the washing solution by the film (Actual $CO_{Ag}$) in mg/m² and
the amount of silver being brought into the washing solution by the film as would be theoretically expected on the basis of carry-over of silver from the fixing solution to the washing solution (theoretical silver carry-over:Theoretical $CO_{Ag}$)

$$\text{Theoretical } CO_{Ag} = \text{carry-over} \times \text{silver content}$$

$$\text{Silver equilibrium ratio} = \text{Actual } CO_{Ag}\text{:Theoretical } CO_{Ag}$$

where the silver content is the silver content in the fixer solution (expressed in mg/ml or in g/l). Unless otherwise specified, this "silver equilibrium ratio" refers to the average value in running equilibrium conditions.

The "fixer/film silver ratio" is defined as the ratio between the silver content in running equilibrium condition of the fixer and the amount of silver in the film which should be fixed in the fixing step (silver halide), expressed as metallic silver in g/m² (average value). In photographic praxis this ratio is typically between 0.5 and 10.

In the electrolytical desilvering of fixers, most equipments adapt the current to the silver content in the fixer (higher currents when much silver is present, lower currents as the silver concentration decreases).

The "response of the electrolysis unit" (expressed in A(mpère)×liter per g) is defined as the ratio between the current (in A) through the electrolysis unit(s) and the silver content in the fixer (in g/l, expressed as amount of metallic silver).

In case of well-controlled electrolysis units, the current is proportional to the silver content over a large part of the current range, and in this case the response is corresponding with the slope of the current versus silver concentration curve. In this case the desilvering rate is proportional to the silver content and the silver content decreases exponentially as a function of time (when no film is processed).

Half the concentration time ($t_{1/2}$) expressed in minutes, refers to the time of desilvering in order to reduce the silver concentration by 50%. In this case the said "half the concentration time" is approximately equal to:

$$t_{1/2} = 10 \times \text{Volume of fixer unit:Response}$$

wherein the volume of the fixer unit is expressed in liter and wherein the response is defined in A(mpère)×liter per gram.

Said "half the concentration time" is preferably below 20 hours, in order to allow the desilvering unit to catch up over night (when no film is processed). On the other hand the fixer volume should be large enough to really reduce or avoid sudden increases of silver concentration in the fixer due to "peak processing conditions" wherein, during the working hours, much film is processed over a short period of time, during the so-called "peaks".

In case of electrolysis units where the current is not proportional to the silver content (or only over a limited range of the current), the response is defined as the ratio between the electrolysis current and the silver content in running condition as defined above. During electrolysis it is well-known that a pH decrease occurs and that sulfites are oxidized. Processing without any intermediate rinsing step, combined with extremely low replenishment rates is only allowed as sulfites and hydroxyl ions are carried over from the developer to the fixer. Automatic processors having intermediate rinsing steps between the developer and the fixer make higher replenisher amounts necessary in order to avoid flocculation of sulfur due to too low the pH value and too low the amounts of sulfites. The present invention as described herein relates to methods of processing wherein intermediate rinsing is present or absent in the processing.

Fixing is known in the art to be performed in one or more steps. In most applications as in the processing of exposed black-and-white silver halide photographic materials according to the method of the present invention, fixing is performed in only one step. In "cascade fixing" however the film is fixed in a number of steps. Usually, the fixing steps are arranged in such a way that in the "fixing cascade" the film is brought successively into contact with fixing agent which is less polluted or contaminated the more fixation proceeds in a countercurrent flow of film and fixing solution. The film thus enters into the first section of the fixing unit and leaves the said unit in the n-th section. Fresh fixer is added into the n-th section and runs from the n-th to the (n−1)th section. The fixer leaves the fixing unit in the first section, where it is contaminated with silver, developer and substances leaving the film during processing up to a maximum degree. The present invention as described herein however relates to a method of processing wherein fixing is essentially performed in one step. Rinsing, also called "washing", is normally performed with tap water, but use of a stabilizing solution is not excluded in the method of the present invention.

In one embodiment in the present invention the volume of the fixing liquid is very important since in many applications, film processing is not performed continuously. If processing is discontinuous it may happen that a substantial part of the daily processing load is processed in a relatively short time. E.g. it may happen that for an application wherein typical amounts of film of about 8 $m^2$ of film per day are processed, 4 $m^2$ are processed from 8.00 a.m. till 11.00 a.m. and that the residual 4 $m^2$ are processed between 11.00 a.m. and 23.00 p.m., corresponding to a much longer time interval.

In order to reduce the amount of silver in the rinsing water (or in the stabilizing rinsing solution), the silver concentration in the fixer should be kept low during processing. If processing is discontinuous, relatively large electrolysis units are required if the electrolysis unit should keep up with the release of silver from the film. As a consequence the electrolysis unit should be designed to accomodate for peak amounts of silver released per unit of time. If the fixer volume is larger the silver which is released from the film will be diluted into the total fixer volume, thus preventing too large an increase of silver concentration in the fixer (and as a result thereof further in the rinsing water and/or stabilizer). The higher the processing speed of the processor as is known in the praxis of rapid processing applications according to the method of the present invention, the more silver may be released per unit of time.

A faster processor therefore requires a larger fixer, i.a. (buffering) volume. According to the method of the present invention the ratio of the fixer volume (expressed in liters) to the speed of the processor (in cm/min) is typically higher than 1.0 and preferably even higher than 2.0.

In very slow processing conditions the said ratio is preferably even larger and easily reaches a value of 4.0.

Too large a fixer volume on the other hand has several disadvantages. Apart from the space required for an extra volume amount of fixer, too large a fixer volume tends to slow down the desilvering process since the silver is diluted into a larger volume and as the silver concentration and the desilvering current will be lower.

Moreover if the ratio of the fixer volume to the response of the electrolysis unit is too high the desilvering unit will not be able to desilver the whole fixer volume during periods wherein low amounts of film materials are processed or when even no processing occurs as may typically be the case overnight.

In a typical example in the processing of an industrial X-ray material, the maximum amount of silver released per 10 minutes may be about as high as 24 g of silver. Without taking into account the volume of the fixer liquid, the electrolytical desilvering unit should deliver an electrical current of about 35 A. Moreover if this current should flow while keeping the silver concentration as low as 1 g/l this would require an electrolysis unit with a response as defined hereinbefore of 35. If enough fixer buffering volume is present an electrolysis unit which is 10 times smaller will be satisfactory.

If the volume is excessively large (e.g. 200 l) and the electrolysis unit has a low response the desilvering will not be complete and there is a relatively small gain as the fixer volume increases. (a 200 l fixer liquid equipped with an electrolysis unit of response 0.5 will typically even take up to 5 days to get desilvered!).

Quite surprisingly we have found now that as the silver content remaining present in the rinsing water becomes ecologically more and more important, not all factors which contribute to the amount of silver in the wash water are known and/or optimized.

Apart from the silver in the washing water which is caused by insatisfactory fixing (as expressed by the silver equilibrium ratio) and the silver which is brought into the rinsing water by carry-over of fixer containing silver there is a third contribution of silver in the rinsing water. So from our experiments described hereinafter (see Example 1), it appears that the metallic silver from the black silver image generated by reduction in the developer unit of the exposed silver halide crystals from the black-and-white silver halide photographic material is oxidized in the cross-over section between the fixing step and the rinsing step and is rinsed out of the film in the rinsing step, thereby providing supplementary silver to the washing water (or stabilizer solution). It is thought that this silver originates from the oxidation of the image-wise developed silver (metallic silver) by the oxidation which takes place primarily in the said cross-over.section. Moreover metallic silver which is oxidized in the last phase of the fixation step may not have had enough time to diffuse out of the film during the residual fixation time and may also be trapped in the film and be washed out in the washing step. Since this effect is time dependent, it even leads to the conclusion that the cross-over time between fixing and washing step may be important with respect to the amount of silver detected in the washing water.

The contribution of this factor can readily be detected by minimizing the contribution of insatisfactory fixing and carry-over of silver containing fixer (as has been shown in Example 2 hereinafter).

This cross-over oxidation doesn't seem to be important in most practical photographic applications. However, as measures are taken in order to minimize the other contributions of silver in the rinsing water, the contribution of cross-over oxidation becomes more and more important.

According to the method of the present invention cross-over time between fixing and rinsing step is in such a time that in "running equilibrium condition of the fixer" the contribution of silver in the fixer by cross-over oxidation is less than 50% of the theoretical amount of silver that could be carried over as expected on the basis of silver content in the said "running equilibrium conditions". More preferably said contribution of cross-over oxidation is less than 20% of the said theoretical carry-over. In the Examples cross-over oxidation is expressed as an amount of metallic silver in mg/m$^2$.

As has already been set forth hereinbefore the method of the present invention is characterized by fixing step, wherein (opposite to "off-line electrolytic desilvering") "in-line electrolytical desilvering" is performed, wherein desilvered fixer solution is continuously in equilibrium with the said fixer.

According to the method of the present invention a ratio between total fixer volume (in l) and processing speed (in cm/min) is higher than 1, and more preferably even higher than 2.0.

In the rapid processing method of the present invention in the fixing step fixation proceeds within a time interval equal to more than 100% up to 150% of the time necessary to reach a "silver equilibrium ratio" ("SER") of 2, counted from starting the said fixing step. Longer fixation times are unnecessarily making processing time increase, without having a pronounced effect on lowering said "SER".

Further in the method according to the present invention fixing occurs in a total fixing volume (expressed in l) between 20 and 60 times an average response (expressed in A(mpère)×liter per gram) of an electrolysis unit in the fixing step.

With respect to replenishing of the fixer, according to the present invention, a processing method is offered wherein an intermediate rinsing step is included between developing and fixing and wherein in the fixing step replenishing of the said fixer is performed in an amount of less than 100 ml and more preferably less than 70 ml per gram of silver deposited while desilvering. Further according to the method of the present invention, in case wherein fixing immediately follows developing then in the fixing step replenishing of the said fixer is performed in an amount of less than 70 ml per gram of silver deposited while desilvering. This lower replenishing amount when desilvering is performed in the absence of intermediate rinsing between developing and fixing is due to the fact that in that case the need to compensate for pH drop in the fixer due to electrolysis is avoided.

Further, according to the processing method of the present invention in the fixing step the fixing solution has a volume between 60 and 150 liters and said desilvering proceeds in an electrolysis unit having a response between 3 and 10, said response (expressed in A(mpère)×liter per g) being defined as ratio between electrical current (in A) through the said electrolysis unit and silver content in the fixer (in g/l, expressed as amount of metallic silver).

With respect to the materials coated with huge amounts of silver as is the case for radiological film materials as e.g. for non-destructive testing materials, according to the method of the present invention the total processing time is at most 5 minutes and said exposed black-and-white silver halide photographic material comprises a total amount of silver halide, expressed as an equivalent amount of silver nitrate, per square meter and per side, in the range from 5 to 15 grams; and gelatinous hydrophilic colloid layers hardened to such an extent that after rinsing and before drying the material has an amount of water absorption of not more than 2 grams per gram of gelatin.

By the processing method of the present invention photographic materials are processed which are coated from huge amounts of silver as e.g. those wherein said materials are composed of a transparent resin support, e.g. a blue coloured polyester support like polyethylene terephtalate, wherein the thickness of such organic resin film is about 175 μm and wherein the support is provided with a substrate layer at both sides to have good adhesion properties between the emulsion layer and said support.

Depending on the crystal size of the silver halide crystals present in the emulsion layer(s) of the materials said materials are differing in sensitivity. In order to get a further fine-tuning of the outlook of the film the absorption spectrum of the material as obtained after the ecological rapid processing cycle described in the present invention may be obtained by the addition of suitable non-migratory dyes to the subbing layer, the emulsion layer(s) or the protective antistress layer(s) or to the topcoat layer at both sides of the support. A blue coloured dye is therefore recommended, especially for films having a lower speed.

It has been established that industrial non-destructive testing materials belonging to a set of X-ray materials differing in speed which are image-wise exposed by means of an X-ray radiation source the energy of which, expressed in kV, depends on the specific application and which are processed according to the method of the present invention are leaving the processor in a dry state with perfect physical properties, without damaging phenomena such as sticking after having been passed the drying section (e.g. provided with infrared drying means) of the processing cycle or scratches due to contact of swollen hydrophilic layers of the film material with conveying means in the processor. Moreover the processed film material shows a perfect glare and suitable antistatic characteristics, especially when e.g. laponites are used in the (preferably uppermost) protective antistress layer as has e.g. been described in EP-A 0 644 454. According to the objects of the present invention it has been established that the washing solution is loaded with an ecologically acceptable amount of silver as set forth hereinbefore.

Said black-and-white silver halide photographic film materials belonging to an assortment of films as e.g. the STRUCTURIX-assortment, trademarked products from Agfa-Gevaert, are normally exposed within a ratio of relative exposure factors, for an exposure with a 200 kV radiation source with a copper filter of 8 mm thickness, of not less than 20 as those industrial X-ray film materials are differing in speed. Another typical radiation source used for such applications is a radioactive Co$^{60}$ source. In order to reduce the effect of scattering radiation a metal screen, usually a lead screen, can be used in combination with the photographic film. The generation of secondary electrons by this metal screen is in favour of definition and enhances the sensitivity as well. Materials differing in speed may comprise one or more silver halide emulsion(s) having grains with an average equivalent volume grain size of the silver halide emulsion grains of from 0.1 up to 1.0 μm. Said silver halide grains are further preferably regular silver bromoiodide crystals having iodide in an amount of less than 3 mole %, wherein grains having another crystal habit as e.g. tabular {111} of {100} grains having chloride, bromide or iodide as halide, alone or in suitable mixed compositions. A survey about composition and morphology of silver halide emulsion crystals, silver halide emulsions, their precipitation, flocculation, washing or ultrafiltration and redispersion, chemical ripening, stabilization, etc. has been described e.g. in Research Disclosure No. 38957, published Sep. 1, 1996, without being limited thereto. Built-up of the materials used in the method of the present invention is further preferably so that a weight ratio of gelatin to silver halide (expressed as silver nitrate) in the silver halide emulsion layers of said materials is comprised between 0.4 and 1.0. Moreover the gelatin used in the said materials is preferably hardened by means of a vinyl sulphonyl hardener, wherein said vinyl sulphonyl hardener is preferably di-(vinyl-sulphonyl)-methane or ethylene di-(vinyl-sulphone). A survey of other useful hardeners can be find in the RD 38957, referred to hereinbefore.

In the method according to the present invention, in favour of ecology, said developing and/or fixing solution(s) is(are) free from hardening agents in order to provide one-part packages, directly ready-for-use after simple dilution with water to the prescribed extent.

According to the present invention a processor has been provided, having means for processing exposed silver halide photographic materials under fixing conditions of "silver equilibrium ratio of less than 2.0; and "fixer to film silver ratio" of less than 0.2 as explained hereinbefore, in order to get an ecologically favourable minimization of silver content in the washing solution without impairing processing speed, without enhancing processing costs and without excessive regeneration, fully according to the method of the present invention.

As will be illustrated hereinafter in the Examples it has been lear-ned from our processing experiments that when fixing is performed in one step that in order to obtain a "silver equilibrium ratio" of less than 2.0 one or more of following conditions are advantageously used:

enhancing processing temperature;

increasing processing time;

providing a fixer composition having rapid fixing ability;

making use of a rinsing station between developing tank and fixing tank in order to avoid cross-over of rate-inhibiting developer solution in the fixer solution;

choosing a suitable composition and layer arrangement for the material to be processed: material coated with lower amounts of silver halide emulsion crystals, said silver halide being rapidly processable (as e.g. silver chloride), thus showing good developing and fixing ability;

applying "active processing" in an automatic processor (e.g. many rollers, good agitation).

According to the method of the present invention following measures are therefore effectively used, alone or in combination:

enhancing processing temperature from a value where no crystallization of developer nor fixer appears up to a maximum of about 32° C.;

reducing processing times up to a preferred total time from inserting the material in the automatic processor up to taking out the dried material of at most 5 minutes (instead of e.g. 8 minutes, normally used e.g. for non-destructive testing materials);

providing a fixer composition having rapid fixing ability by the presence of suitable amounts of ammonium ions and thiosulphate ions, and a suitable balance of ammonium ions to sodium and/or potassium ions;

providing a fixing time being not too short (as the "SER"-value will not decrease below 2.0) and not too long (as long fixation times will not make decrease "SER" further to a considerable extent and as longer processing times, resulting therefrom, are undesirable);

avoiding increased replenishing amounts;

effectively making use of a rinsing station between developing and fixer tank;

making effectively use of "active processing" as defined above.

Otherwise from our processing experiments the said fixer to film silver ratio of less than 0.2 is attained in following conditions:

making use of high replenishing volumes per sq.m. of film;

removing silver ions from the fixer solution (desilvering e.g. by precipitation, by ion exchange techniques or by electrolysis).

In case of desilvering by electrolysis use has been advantageously made of a buffering vessel. A very quick response and low amounts of film to be processed are known to be favourable. Combination of electrolysis and ion exchange moreover leads to pick-up by ion-exchangers of silver ions when huge amounts of material are processed, whereas said ions are lost again when low amounts of material are processed. It has been established that a low fixer to film ratio has clearly been obtained by electrolysis with the addition of a buffering vessel as described herein, which is required as in case of high silver load of silver halide materials (e.g. non-destructive industrial film materials exposed by direct X-rays!).

As will be demonstrated hereinafter in the Examples it has indeed surprisingly been established that the method of the present invention is advantageously applied, even when use is made of a material which is loaded with relatively huge amounts of silver halide emulsion crystals (from 5 up to 15 g of silver, expressed as silver nitrate, per square meter and per side), even when said silver halide crystals are less rapid developable silver bromoiodide crystals (opposite to e.g. more rapid developable silver chloride crystals). According to the method of the present invention the required "silver equilibrium ratio" and the required "fixer to silver ratio" thus have effectively both been provided simultaneously by application in the processing of the measures set forth hereinbefore.

The present invention can better be appreciated by referring to the following specific examples, which are intended to be illustrative and not exhaustive.

EXAMPLES

Example 1

Dissolution of Metallic Silver in the Fixer

In this Example the dissolution of metallic image silver in the fixer solution has been illustrated. If an exposed and developed material, substantially free from silver halides is run through a fixer solution in a processor, silver is coming free. Moreover when the film is running further in the cross-over part between fixer solution and rinsing unit, then there is still contact between the black image silver and the fixer solution that has been absorbed in the swollen hydrophilic layers of the processed silver halide photographic material.

As a consequence the said image silver will be set free in the rinsing unit as there is no possibility for it to come free in the fixer unit. An extra amount of image silver is thus coming free in the rinsing unit.

In a practical test the already processed material showing a black silver image was run in a processor (NDT-S, trademarked product from Agfa-Gevaert NV), modified in such a way that an extra fixing unit was added to the fixer unit normally present. Subsequent units present were: (first) water rinsing unit/(first) fixer unit/(second) fixer unit/(second) water rinsing unit. The material was run therein at 28° C. during 4 minutes.

As a test fixer TESTFIX a fixing solution was prepared having following composition:

| | |
|---|---:|
| ammonium thiosulphate | 138.10 g |
| sodium metabisulphite | 19.80 g |
| sodium acetate.3H$_2$O | 32.50 g |
| acetic acid | 7.62 g | demineralized water to make 1 liter of fixer, ready-for-use pH=4.90.

A total amount of 20 m$^2$ of developed STRUCTURIX D7 film (trademarked product from Agfa-Gevaert NV) was run therethrough and following amounts of silver (see Table 1) were measured.

TABLE 1

| NDT-S unit | Total contact time with fixer Carry-over(s) + immersion time(s) | Total dissolution amount of silver (in mg) | Dissolution amount of silver per m$^2$ (in mg Ag/m$^2$) | Dissol. amt. of Ag per s (mg Ag/s) |
|---|---|---|---|---|
| Rinsing 1 | 0 + 0 | 21 | 1.0 | |
| Fixing 1 | 0 + 50 | 1741 | 87.0 | 1.7 |
| Fixing 2 | 10 + 32 | 1190 | 59.5 | 1.4 |
| Rinsing 2 | 10 + 0 | 300 | 15.0 | 1.5 |

From Table 1 it can be concluded that in the first rinsing step a negligible amount of silver has been set free. Opposite thereto in the first and in the second fixer unit amounts of about 90 and 60 mg of silver per m$^2$ have been dissolved respectively. In the rinsing unit following both fixer units, an amount of still 15 mg/m$^2$ has been set free.

Moreover the amount of image silver that has been dissolved is depending on the contact time between the processed film and the fixer unit(s): a remarkably constant amount of silver dissolving per time unit in fixing unit 1, fixing unit 2 and rinsing unit 2 of about 1.5 mg Ag/s.

It has further been established that a shorter cross-over time between second fixer unit and last rinsing unit makes less silver dissolve: lower amounts of silver are detected in the rinsing water in that case.

Example 2

Dissolution of Silver in the Fixer, Run in an Automatic Processor

Example 2A

The influence of the dissolution of silver in the rinsing unit is made clear when the practically measured silver contents of the rinsing water is compared with the theoretically calculated silver amount. Exhaustion of the processing solutions of CURIX ORTHO HT (trademarked product from Agfa-Gevaert NV) film material for medical diagnostic imaging was performed in a CURIX HT530® EOS processor (trademarked product from Agfa-Gevaert NV), wherein cascade fixation is applied. Distribution of silver over the different stations in the processing was determined. Mathematical determinations of silver over the different stations were performed on the basis of silver halide content in the film, degree of exposure, replenishment of the fixer, carry-over and flowing rate of rinsing water. The theoreti-cally determined silver content was compared with the values, practi-cally measured and summarized in FIG. 1. For both fixer units the values of silver content measured are about exactly the same as those calculated. For the rinsing unit only there is a clear deviation from the expected values, as has been illustrated in the said FIG. 1.

Already from the start of the processing there is much more silver present than theoretically calculated (carry-over multiplied by silver concentration in the second fixer unit). The high silver content at the start of the processing is due to the dissolution effect in the cross-over section between the second fixer unit and the rinsing unit. As a consequence the silver content in the rinsing unit is relatively high, although there is only a silver content present in [Fixer]$_2$ of about 0.02 g per liter. The relatively high silver content in the rinsing unit however is a significant ecological disadvantage.

Example 2B

A similar experiment as in Example 2A was performed with non-destructive silver halide materials as used in Example 1. In the NDT-S processor an exhaustion experiment was performed with cascade fixation, without a rinsing step inbetween. TESTDEV, defined hereinafter, and TESTFIX, defined hereinbefore, were used as developer and fixer respectively.

Rinsing was performed with rinsing water in a standard amount of 12 liter per square meter of processed film. Exhaustion was performed with STRUCTURIX D7 material, processed in an amount of 20 m$^2$ per day. at 28° C. for a total processing time cycle of 5 minutes.

During exhaustion the first fixer solution was desilvered with an adapted SILVERFIX unit (trademarked product from Agfa-Gevaert NV) as stand alone electrolysis apparatus for non-destructive testing processing applications.

As a test developer TESTDEV a developing solution was prepared having following composition:

| | |
|---|---:|
| potassium sulphite | 86.50 g |
| potassium bromide | 5.00 g |
| hydroxy-ethyl-diphosphonic acid; sodium salt | 0.56 g |
| ethylene diamine tetra acetic acid; tetrasodium salt | 2.41 g |
| diethylene glycol | 17.86 g |
| hydroquinone | 30.00 g |
| 1-phenyl-5-mercaptotetrazole | 11.60 mg |
| borax | 10.00 g |
| potassium carbonate | 21.42 g |
| potassium hydroxide | 8.76 g |
| 4-hydroxymethyl-4'-methyl-phenidone | 2.28 g | demineralized water to make 1 liter of developer, ready-for-use pH=10.33

In order to calculate the silver content in the rinsing water the amount of silver effectively measured in [Fixer]$_2$ was taken, further taking into account a carry-over of 45 ml/m$^2$ from fixer to rinsing unit.

During exhaustion processing (thus without replenishing) of STRUCTURIX D7TC in the said NDT-processing machine with cascade fixing and desilvering electrolysis unit following amounts of silver were measured as summarized in Table 2.

TABLE 2

| | MEASURED AMOUNTS OF SILVER | | | CALCULATED | DIFFERENCE (in Ag load) |
|---|---|---|---|---|---|
| Film (m$^2$) | Fixer1 g Ag/l | Fixer2 g Ag/l | Rinsing water mg Ag/l | Silver load mg/m$^2$ | Silver load (mg/m$^2$) | Measured minus Calculated (mg/m$^2$) |
| Start | 0.00 | 0.00 | 0.1 | 1.3 | 0.0 | 1 |
| 5 | 0.54 | 0.09 | 1.7 | 21 | 4.1 | 17 |
| 10 | 0.60 | 0.10 | 1.3 | 16 | 4.5 | 12 |
| 20 | 0.80 | 0.11 | 1.4 | 18 | 5.0 | 13 |

As can be concluded from Table 2, from the start of the experiment a relatively high amount of silver was present in the rinsing water, while the second fixer unit [Fixer]$_2$ was still free from silver at the same time. By application of cascade fixation there were no problems encountered with respect to fixation of the silver halide photographic material coated from huge amounts of silver as the STRUCTURIX D7TC® material for non-destructive testing (see therefore the very low amounts measured in [Fixer]$_2$). Too high an amount of silver load of the rinsing water is due to oxidation of image silver during carry-over (cross-over) from [Fixer]$_2$ to the rinsing unit. Values of silver load, calculated as a difference between measured and calculated values in the rinsing water are corresponding quite well to the values given for the rinsing unit 2 in Table 1 for Example 1.

Example 3

The following Example shows the contribution of insatisfactory fixing to the total amount of silver carried over to the rinsing water unit (silver equilibrium ratio). Different fixer compositions were compared. Simulations of fixing solutions in running conditions were prepared using fresh fixers adding thereto (as indicated in Table 3) developer solution (in amounts of 4% and of 16%), silver (1.5, 4 and 10 g/l) and acetic acid (in order to simulate acidification occurring during electrolysis). Moreover 1 sample of an actual desilvered fixing bath was used. The different fixing solutions were composed as follows (see Table 3)

TABLE 3

| Fixer number | | Composition |
| --- | --- | --- |
| 1 | simulated used fixer | G333c* fresh (1 + 4) + 0.64 l G101c* (1 + 2) + 0.48 litre of Ag solution |
| 2 | simulated used fixer | G333c* fresh (1 + 4) + 0.64 l G101c* (1 + 2) + 1.28 litre of Ag solution |
| 3 | simulated used fixer | G333c* fresh (1 + 4) + 0.64 l G101c* (1 + 2) + 3.2 litre of Ag solution |
| 4 | simulated used and desilvered fixer | G333c* fresh (1 + 4) + 2.56 l G101c* (1 + 2) + 0.64 l Ag solution + 30 ml (96%) of acetic acid |
| 5 | actual used and desilvered fixer | from Fixer Rapiline 72* having in running equilibrium conditions 1.5 g Ag/l |

*all trademarked products from Agfa-Gevaert NV

For each of the experiments the silver in the rinsing water was determined and the actual and the theoretical amount of silver were compared (calculated as mg of metallic silver, released in the washing step per m$^2$ of film processed). Carry-over was approximately 14 ml/m$^2$. Data are given in Table 4.

TABLE 4

| | Silver in fixer (g/l) | Theoretical amount of silver* (mg/m2) | Actual amount of silver (mg/m2) | Silver equilibrium ratio |
| --- | --- | --- | --- | --- |
| 1 | 1.5 | 21 | 23 | 1.1 |
| 2 | 4 | 56 | 40 | 0.7 |
| 3 | 10 | 140 | 96 | 0.7 |
| 4 | 1.5 | 21 | 65 | 3.1 |
| 5 | 1.5 | 21 | 992 | 47 |

*silver in fixer multiplied by carry-over

It is clear from the data summarized in Table 4 above that major differences may exist between the expected and the observed amount of silver in the rinsing water. The silver in the washing or rinsing step may be appreciably higher than could be expected on the basis of the amount of silver in the fixer and carry-over amounts. It is important to notice that in the experiments as described herein, there were no problems, nor from a photographic point of view, nor with respect to application concerning fixing and/or processing (archivability more than 100 years!).

It is however unclear why in experiments Nos 2 and 3, the silver equilibrium ratio is less than 1: this may have been attributable to an inaccuracy in the determination of the carry-over, or it may have been caused by a relatively low concentration of silver in the fixer carried over from the fixing to the rinsing unit (due e.g. to expulsion of silver out of the emulsion layers of the exposed silver halide photographic material during processing).

The use of a longer fixation time, a higher replenishing rate, or a higher fixation temperature may bring the silver equilibrium ratio to lower values and may result in more ecological processing.

Example 4

Example 4A

The present Example is illustrative for changes of "silver equilibrium ratio" as a function of exhaustion (replenishing degree) and of processing time.

Both factors (processing time and replenishment) have a significant influence on the degree of fixation of the silver halide photographic material.

So in a CURIX HT330 processor (trademarked product from Aga-Gevaert NV), provided with cascade fixation units, G138 and G334, representing the (hardening) developer and the (hardening) fixer solution respectively (both being trademarked product from Aga-Gevaert NV), an exhaustion experiment was performed at a developing temperature of 38° C. for a processing time cycle of 1 minute.

Replenishing amounts were 600, 400, 300 en 200 ml/m$^2$ respectively.

In running conditions (equilibrium state) CURIX ORTHO HT® en MAMORAY MR5® materials for medical diagnostic imaging (both being trademarked product from Aga-Gevaert NV), were processed at different moments and for different replenishing amounts.

Values of "silver equilibrium ratios" (further called "SER") were determined and the results were summarized in the following Table 5.

The silver released in the rinsing section was determined by calculating the difference in silver content of the film before and after the rinsing section. Due to inaccuracies in this determination "SER" below 2 tend to be more inaccurate.

TABLE 5

| | CURIX ORTHO HT ® Replenishment (ml/m$^2$) | | | | MAMORAY MR5 ® Replenishment (ml/m$^2$) | | | |
| --- | --- | --- | --- | --- | --- | --- | --- | --- |
| Time (s) | 600 | 400 | 300 | 200 | 600 | 400 | 300 | 200 |
| [Ag]$_{fix}$ | 7.3 | 10.4 | 13.8 | 20.4 | 7.3 | 10.4 | 13.8 | 20.4 |
| 23 | 5.4 | 4.7 | 4.7 | 3.7 | 6.6 | 4.3 | 3.5 | <2 |
| 30 | 2.0 | 2.6 | 3.3 | 3.9 | 6.4 | 4.9 | 3.5 | 2.1 |
| 43 | <2 | <2 | <2 | 2.4 | 2.4 | <2 | 3.3 | 2.8 |
| 60 | <2 | <2 | <2 | <2 | <2 | <2 | <2 | 2.6 |
| 84 | <2 | <2 | <2 | <2 | <2 | <2 | <2 | 2.0 |
| 120 | <2 | <2 | <2 | <2 | <2 | <2 | <2 | <2 |
| 165 | <2 | <2 | <2 | <2 | <2 | <2 | <2 | <2 |

It is clear that "SER" strongly depends on processing times.

Further as can be concluded from the data given in Table 5 there is a clear difference between materials differing in composition: so the MAMORAY® material requires a longer processing time and fixation time as well at the start as in running equilibrium conditions, especially for lower replenishing amounts, if compared with the CURIX®-material as in this experiment.

Example 4B

In this Example the influence of processing time and processing temperature on SER-values has been demonstrated, in particular for non-destructive film materials coated with huge amounts of silver. The experiments were performed on a prototype NDT processing machine having 4 tanks with cascade fixation. TESTDEV and TESFIX, the composition of which has already been described hereinbefore as test developer and test fixer respectively, were replenished with the same solutions in an amount of 450 ml/m$^2$ for the developer and 535 ml/m$^2$ for the fixer. Rinsing water was used in an amount of 12 l/m$^2$. The processing machine was brought into running equilibrium condition by exhaustion with STRUCTURIX D7TC® pro-cessed in an amount of 15 m$^2$ per day. Processing was carried out at 28° C. for a processing cycle of 5 minutes. Silver contents of the second fixer and of the rinsing water were determined by atomic absorption spectrophotometry (AAS). The results of these experiments are summarized in Table 6.

TABLE 6

| Processing | "SER"-values | | |
|---|---|---|---|
| Time (min.) | 28° C. | 30° C. | 32° C. |
| 2' | 22.5 | 11.5 | 7.5 |
| 2'30 | 16.6 | 4.0 | 4.0 |
| 3' | 10.2 | 2.5 | 2 |
| 3'30 | 4.5 | 1.5 | 1 |
| 4' | 2.6 | 1 | 1 |
| 5' | 1.5 | 1 | 1 |
| 5'30 | 1.3 | 1 | 1 |
| 6' | 1.3 | 1 | 1 |
| 7' | 1 | 1 | 1 |
| 8' | 1 | 1 | 1 |

As is clear from Table 6 an improvement of SER-values can be obtained at a higher processing (fixation) temperature as well as at longer processing times. For a processing time of shorter than 5 minutes an enhanced fixation temperature effectively leads to lower SER-values.

Example 5

Following experiments show that even when all photographic properties are fulfilling the requirements set forth, in particular with respect to archivability, ecological aspects are not neccessarily decisive. Apart from the known rule of thumb (fixation=2× clearing time) or the more accutate determination of the necessary fixation time by measuring archivability, other factors, are important too. Therefore the following experiment was performed in a total processing time of 5 min at 28° C. in an NDT-S processor. The said processor was filled with TESTDEV and TESTFIX as in experiments hereinbefore, rinsing with water being 12 liter per minute. In connection with the fixer solution a SILVER-FIX® desilvering (electrolysis) unit was mounted. Exhaustion in order to reach silver equilibrium running conditions was performed with STRUCTURIX D7TC®-film in an amount of 20 m$^2$ per day. Archivability was more than 500 years during the whole experiment. In running equilibrium conditions the silver contents of fixer and rinsing water were followed for 24 hours. The results are given in Table 7.

TABLE 7

| Exhaustion | Silver amt. in Fixer (g/l) | Silver in rinse water (mg/l) | Silver load (mg/m2) | Calculated silver load (mg/m2) | SER |
|---|---|---|---|---|---|
| Start | 0.139 | 0 | | | |
| 4 m$^2$ | 1.60 | 45 | 540 | 72 | 7.5 |
| 8 m$^2$ | 2.50 | 76 | 912 | 113 | 8.1 |
| 12 m$^2$ | 3.77 | 87 | 1044 | 170 | 6.1 |
| 16 m$^2$ | 4.48 | 94 | 1128 | 202 | 5.6 |
| 20 m$^2$ | 5.10 | 105 | 1260 | 230 | 5.5 |

Even without electrolysis archivability was already in order. In the presence of a desilvering unit no problem could thus be expected. Attaining the desired low silver load of from 30–50 mg/m$^2$ asks for a fixation time that should be much longer than if only "archivabilty" would be required.

In Table 8 a survey has been given at differing processing times of total fixing velocity (Fixer 1 and Fixer 2; see SER-values) and archivability of STRUCTURIX D7TC in a processor having cascade fixation means and desilvering means.

TABLE 8

| Processing time (min.) | SER values | Archivability (years) |
|---|---|---|
| 2' | 17.3 | NOT OK |
| 3' | 3.3 | OK |
| 4' | 0.8 | OK |
| 6' | 1.2 | OK |
| 8' | 1.2 | OK |

As a requirement in order to get a good archivability a time interval of more than 100 years has been set forth.

In case of 2 minutes processing time nor archivability, nor SER-values were satisfying.

For a total processing time of 3 minutes, archivability was sufficient but too much silver was carried over to the rinsing unit.

From a processing time of 4 minutes SER as well as archivability were both reaching the requirements as set forth.

From this experiment it becomes clear that reaching the low level of silver load in the rinsing unit, which is clearly insufficient for a processing cycle of 3 minutes, lays burden on the fixation process to a remarkable extent, opposite to archivability, the norm of which is already met for a 3 minutes processing cycle.

Example 6

An example of a complete working operational system according to the method of the present invention is the following. In particular a description is given now with respect to an ecological processing system for non-destructive testing materials.

Processing machine: NDT-S, trademarked product from Agfa-Gevaert.

Processing time: 5 min processing at 28° C. for the developer and 32° C. for the fixer solution (51 cm/min.).

Developer TESTDEV (1+1.5): as described hereinbefore, free from hardening agents.

Fixer TESTFIX (1+3), free from hardening agents.

Replenishers: same solutions as TESTDEV and TESTFIX, in amounts of 450 ml/m² for the developer and 750 ml/m² for the fixer solution.

Electrolysis (SILVERFIX, trademarked product from Agfa-Gevaert NV) on the fixing unit (operating 24 hours on 24 hours a day!)

Volume of fixing tank: 20 l.

Buffering vessel of 100 liter on the fixing unit (total volume of fixer: 120 l).

Circulation of ±4 l/min between fixing unit and buffering vessel.

Processing of STRUCTURIX D7® film material (⅓ of total surface exposed).

From our experiments this system has proved to provide a good archivability (more than 500 years!), an excellent processing speed (access time 5 min), a measured average silver freight of about 40 mg of silver per square meter of processed film material, a "SER"-value well below 2.0, a fixer to film silver ratio of 0.09, and a response of 3 A l/g.

Example 7

The same system as described in Example 6 was considered in order to make a simulation of the influence of the volume of the buffering vessel on changes of silver load in the fixer unit. The size (volume) of the fixer buffering vessel is very important. Higher sizes provide lower silver freights but are disadvantageous in terms of space and weight. Too low a volume dramatically increases the silver freight values.

Figure 2:
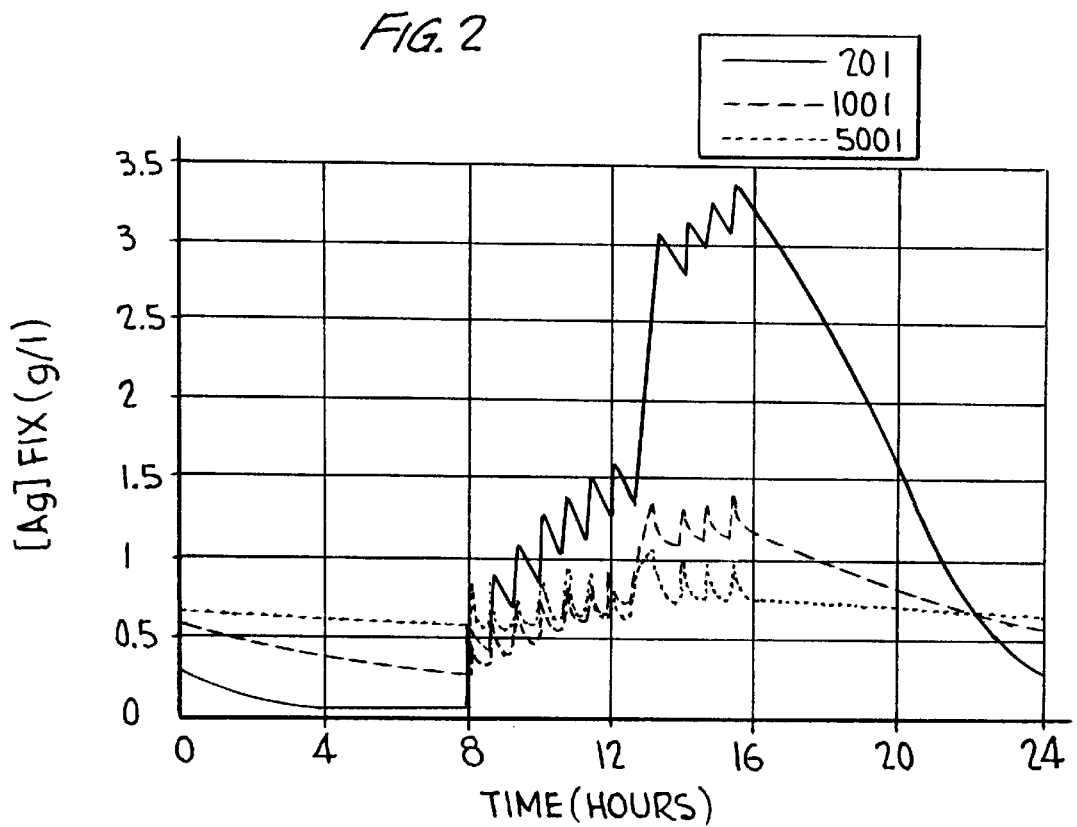
FIG. 2 represents a simulation of the influence of the volume of the buffering vessel (20 l, 50 l and 100 l respectively) on changes of silver load in the fixer Unit (in g/l), said fixer being provided with a desilvering unit as a function of a 24 hour time cycles, showing the situation at "peak moments" of the processing.

Following curves as set forth in FIG. 2 show e.g. 3 different total fixervolumes of 20, 100 and 500 liter.

The corresponding freights are 113, 47 and 35 mg of silver per square meter.

A value of 100 l allows us to bring the freight below 50 mg/m² (legal requirement), without the need for huge volumes of the buffer vessel.

The response of the electrolysis unit in the experiment was 3 A l/g of silver.

This results in a ratio of fixing volume/response of 7, 33 and 166 for the volumes of 20, 100 and 500 respectively

Example 8

Figure 3:
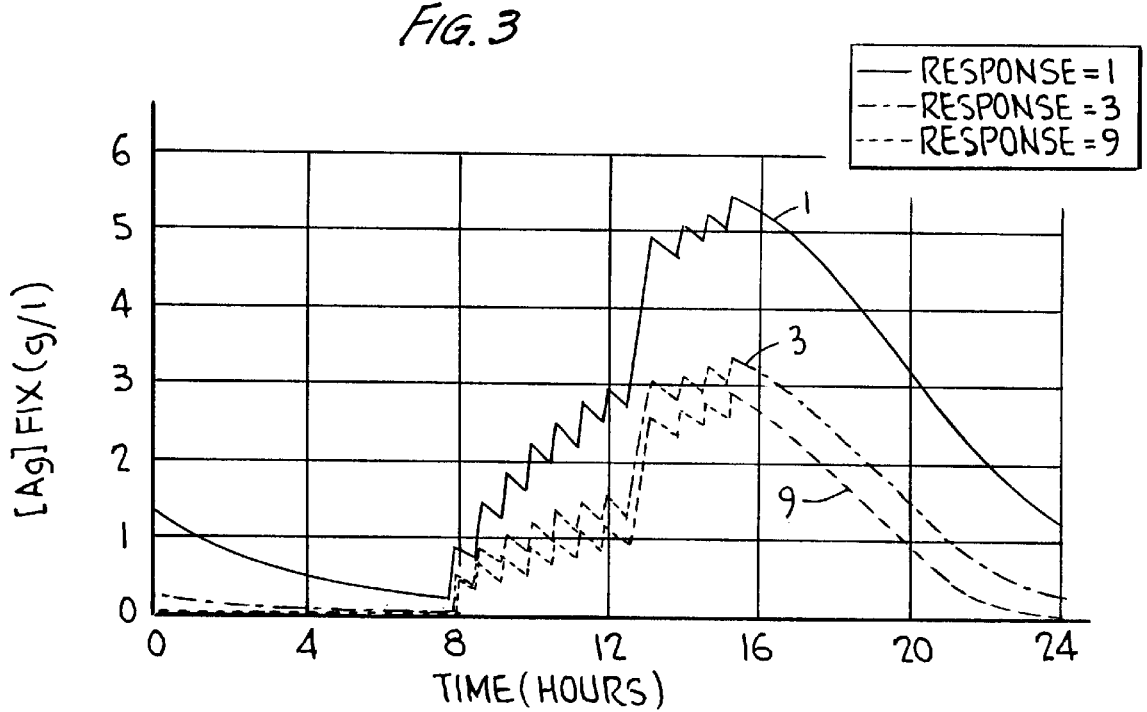
FIG. 3 shows the influence of a response of 1, 3 and 9 for the desilvering electrolysis unit on changes of silver load in the fixer unit (in g/l) as a function of a 24 hour time cycles, showing the situation at "peak moments" of the processing.

A similar experiment was performed as in Example 6 hereinbefore, apart from the absence of a buffering tank, and made use of a response of 1, 3 and 9 for the electrolysis unit. This resulted in freight values of 185, 113 and 97 mg of Ag/m² (see FIG. 3). High responses yielded lower silver content in the rinsing water because the fixer was desilvered faster. However none of the freight values was below 50 mg/m², because the ratio of fixer volume to processing speed was too low (calculated value: 0.4!).

Example 9

Referring to Example 6 wherein the total fixer volume was 120 l (fixer tank volume+buffer tank volume) the fixer was pumped back and forth between the fixing tank (on which the desilvering unit was placed) and the buffering tank.

When the exchange rate was too low, the fixer loaded with silver was not evacuated fast enough to the buffer tank, and therefore, more silver was found back in the rinsing water.

Figure 4:
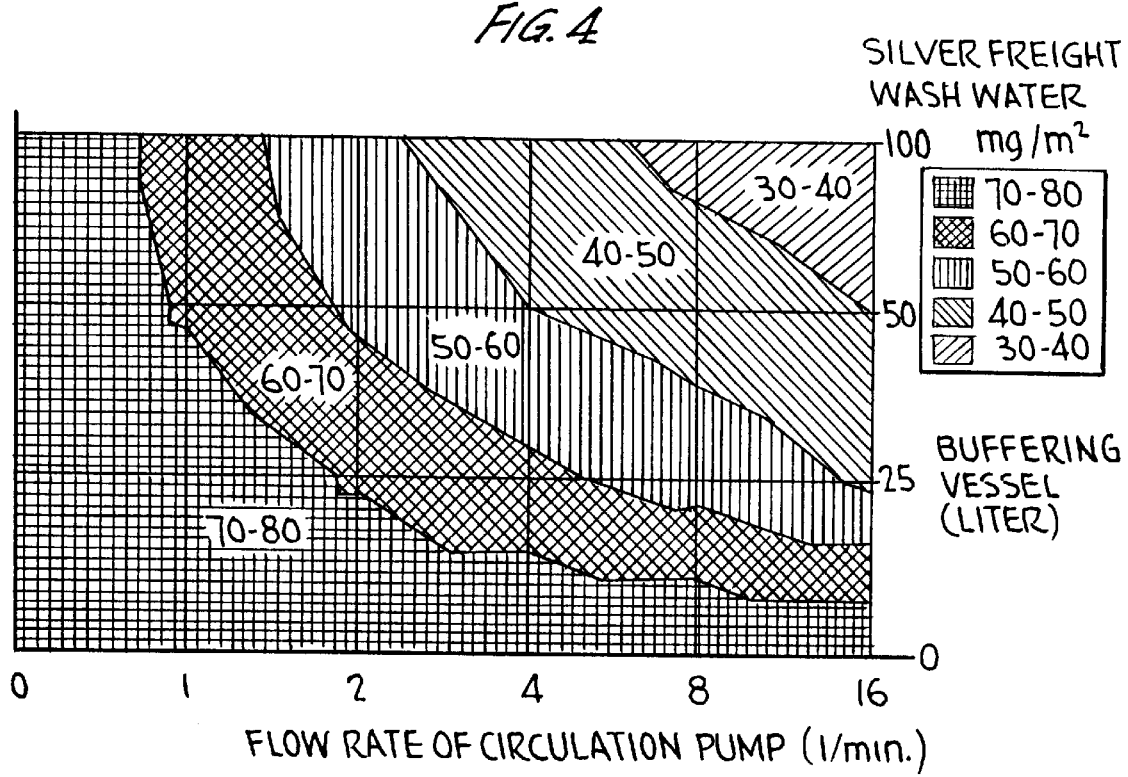
FIG. 4 simulates the daily average freight in zones differing in silver contents (expressed in mg Ag per m$^2$ of film) for buffer volumes as a function of pump circulation velocity from fixer to buffering vessel and vice versa in a processing situation wherein 15 m$^2$ of film were processed per day.

Following graph (FIG. 4) shows the daily average freight for a processing situation wherein 15 m² of film were processed per day. In practical applications, the exchange rate was 4 l/min and the total volume was 120 l. This was considered to be a good compromise between cost of the pump, silver freight and volume of the fixer.

Example 10

An experiment was performed using a standard NDT-S® processor wherein use was made of G135® as developer and G335® as fixer (all trade names from Agfa-Gevaert NV). To the fixer, some sulfite was added in order to compensate for losses due to electrolysis. The NDT-S processing machine was connected to a SILVERFIX® electrolysis unit, and standard processing was performed (32 cm/min, 8 min, 28° C.). An amount of 15 m² of STRUCTURIX D7® film was processed every day. The average daily silver freight was below 40 mg/m², which was sufficiently low in order to reach the objects of this invention.

Having described in detail preferred embodiments of the present invention, it will now be apparent to those skilled in the art that numerous modifications can be made therein without departing from the scope of the invention as defined in the following claims.

What is claimed is:

1. Method of processing in an automatic processor an exposed black-and-white silver halide photographic film material comprising the 5 steps of developing in a developer solution, fixing in a fixer solution, replenishing of fixer and developer solution, rinsing in a washing solution and drying, characterized in that fixing is performed in one step and under such conditions that a "silver equilibrium ratio" of less than 2.0 is maintained, the said ratio being defined as the ratio between actual amount of silver brought into the washing solution by the film material in the rinsing step through carry-over (cross-over) of silver from the fixing solution to the washing solution and the total amount of silver that theoretically could be brought into the washing solution by the film material by such carry-over;

a "fixer to film silver ratio" of less than 0.2 is obtained, the said ratio being defined as the ratio between silver content in "running equilibrium condition of the fixer" and amount of silver in the film material to be fixed in the fixing step, wherein said "running equilibrium condition of the fixer" is the condition attained after having replenished said fixing solution twice.

2. Method according to claim 1, wherein said fixing is performed so that said "fixer to film silver ratio" is less than 0.1.

3. Method according to claim 1, wherein cross-over time between fixing and rinsing step is in such a time that in "running equilibrium condition of the fixer" the contribution of silver in the fixer by cross-over oxidation is less than 50% of the theoretical amount of silver that could be carried over as expected on the basis of silver content in the said "running equilibrium conditions".

4. Method according to claim 1, wherein a ratio between total fixer volume (in l) and processing speed (in cm/min) is higher than 1.

5. Method according to claim 1, wherein in the fixing step fixation proceeds within a time interval equal to more than 100% up to 150% of the time necessary to reach a "silver equilibrium ratio" of 2, counted from starting the said fixing step.

6. Method according to claim 1, comprising the further step of "in-line electrolytical desilvering", wherein desilvered fixer solution is continuously in equilibrium with the said fixer.

7. Method according to claim 1, wherein the total processing time is at most 5 minutes and said exposed black-and-white silver halide photographic material comprises a total amount of silver halide, expressed as an equivalent amount of silver nitrate, per square meter and per side, in the range from 5 to 15 grams; and gelatinous hydrophilic colloid layers hardened to such an extent that after rinsing and before drying the material has an amount of water absorption of not more than 2 grams per gram of gelatin.

8. Method according to claim 1, wherein said developer and/or fixer solution(s) is(are) free from hardening agents.

9. Method according to claim 6, wherein fixing occurs in a total fixing volume (expressed in l) between 20 and 60 times an average response (expressed in A(mpère)×liter per gram) of an electrolysis unit in the fixing step.

10. Method of processing according to claim 6, wherein an intermediate rinsing step is included between developing and fixing and wherein in the fixing step replenishing of the said fixer is performed in an amount of less than 100 ml per gram of silver deposited while desilvering.

11. Method of processing according to claim 6, wherein fixing immediately follows developing and in the fixing step replenishing of the said fixer is performed in an amount of less than 70 ml per gram of silver deposited while desilvering.

12. Method according to claim 6, wherein in the fixing step the fixing solution has a volume between 60 and 150 liters and wherein said desilvering proceeds in an electrolysis unit having a response between 3 and 10, said response (expressed in A(mpère)×liter per g) being defined as ratio between electrical current (in A) through the said electrolysis unit and silver content in the fixer (in g/l, expressed as amount of metallic silver).

* * * * *